United States Patent
Wu et al.

(10) Patent No.: US 7,031,114 B2
(45) Date of Patent: Apr. 18, 2006

(54) CONDUCTIVE ADHESIVE FOR MAGNETIC HEAD ASSEMBLY

(75) Inventors: Quansheng Wu, Dongguan (CN); Binhua Tan, Dongguan (CN); Ichiro Yagi, Tai Koo Shing (HK)

(73) Assignee: SAE Magnetics (H.K.) Ltd., Shatin (HK)

( * ) Notice: Subject to any disclaimer, the term of this patent is extended or adjusted under 35 U.S.C. 154(b) by 57 days.

(21) Appl. No.: 10/396,937

(22) Filed: Mar. 24, 2003

(65) Prior Publication Data
US 2004/0070881 A1    Apr. 15, 2004

(30) Foreign Application Priority Data
Oct. 15, 2002   (WO) .................. PCT/CN02/00727

(51) Int. Cl.
*G11B 5/60* (2006.01)

(52) U.S. Cl. .................................. 360/234.6
(58) Field of Classification Search ............ 360/234.6, 360/234.5, 245.8, 323
See application file for complete search history.

(56) References Cited

U.S. PATENT DOCUMENTS

| | | | |
|---|---|---|---|
| 6,317,629 B1 * | 11/2001 | Haak et al. | 604/20 |
| 6,410,137 B1 * | 6/2002 | Bunyan | 428/356 |
| 6,710,975 B1 * | 3/2004 | Sato et al. | 360/234.6 |
| 6,740,192 B1 * | 5/2004 | Lu et al. | 156/330 |
| 6,775,101 B1 * | 8/2004 | Satoh et al. | 360/234.6 |
| 2003/0142444 A1 * | 7/2003 | Tan et al. | 360/234.6 |
| 2004/0075946 A1 * | 4/2004 | Motonishi et al. | 360/234.6 |

* cited by examiner

*Primary Examiner*—Jefferson Evans
(74) *Attorney, Agent, or Firm*—Kenyon & Kenyon LLP

(57) ABSTRACT

A system and a method for bonding a slider to a suspension tongue are disclosed. A set of conductive fibers is embedded in a bonding adhesive binding the slider to the suspension tongue to improve conductivity between the slider and the suspension assembly. The bonding adhesive includes binder resin and silver powder. The slider is composed of aluminum oxide and titanium carbide. The set of conductive fibers is composed of carbon coated potassium titanic acid whisker. The set of conductive fibers range in length from 10 μm to 20 μm, and in diameter from 0.3 μm to 0.6 μm. The set of conductive fibers range in resistance from 0.01 ohm to 0.1 ohm. The set of conductive fibers is mixed with the bonding adhesive in a 1% to 4% mixing ratio.

30 Claims, 6 Drawing Sheets

CONDUCTIVE ADHESIVE FOR MAGNETIC HEAD ASSEMBLY

BACKGROUND INFORMATION

The present invention relates to magnetic hard disk drives. More specifically, the present invention relates to increasing the conductivity of the bonding adhesive used to adhere the slider to the suspension.

In the art today, different designs for actuator arms are utilized to improve the performance of hard disk drives. FIG. 1 provides an illustration of a typical suspension. A base plate 101 has a hole 102 through the center of the piece for coupling to the actuator arm assembly. The base plate 101 is coupled to a loadbeam 103. A suspension tongue 104 is coupled to the loadbeam 103 at the end opposite the base plate 101. The suspension tongue 104 has three suspension tongue barriers 105 for keeping the slider in position. A flexible printed circuit 106 facilitates control of the slider. Strategic holes 107 in the loadbeam 103 increase the efficiency of the actuator arm movement.

FIG. 2 provides an illustration of a suspension coupled to a slider 201. The slider 201 is coupled to the suspension tongue 104. The slider 201 is positioned over the suspension tongue barriers 105. The slider 201 is connected to the flexible printed circuit 106 by trace contact pads 202 at the trailing edge of the slider 201.

FIG. 3 provides an illustration of a cross-section of the slider 201 coupled to the suspension tongue 104. A conductive adhesive 301 couples the slider 201 to the suspension tongue 104. The conductive adhesive 301 is kept in position by the suspension barriers 105. The suspension barriers 105 are polyamide bars attached to the suspension tongue to maintain static stability of the slider in relation to the suspension tongue 104.

In a disk drive, the movement of the slider across the disk causes static charge to accumulate on the slider surface. If the static charge is not removed, the static charge will cause an electrostatic discharge that will damage the magneto-resistive element of the slider. Existing conductive adhesives, such as Eccobond C-6800J, are used in creating the slider and suspension bond to conduct the static charge from slider to suspension. The required resistance between slider and suspension becomes lower and lower as new giant magneto-resistive (GMR), tunneling magneto-resistive or next generation magnetic heads are used. The required resistance between slider and suspension can now be less than 1000 ohms. Existing conductive adhesives can only meet requirements for over 5000 ohms resistance, but cannot meet the new required resistance for GMR heads. Improvements to the conductivity of the bonding adhesive still have to meet already existing requirements of bonding strength.

DETAILED DESCRIPTION

A system and a method for bonding a slider to a suspension tongue are disclosed. In one embodiment, a set of conductive fibers composed of carbon coated potassium titanic acid whisker is embedded in a bonding adhesive composed of binder resin and silver powder. In a further embodiment, the bonding adhesive binds the slider composed of aluminum oxide and titanium carbide to the suspension tongue to improve conductivity between the slider and the suspension assembly. In one embodiment, the set of conductive fibers range in length from 10 µm to 20 µm, in diameter from 0.3 µm to 0.6 µm, in resistance from 0.01 ohm to 0.1 ohm. In a further embodiment, the set of conductive fibers is mixed with the bonding adhesive in a 1% to 4% mixing ratio.

Figure 1:
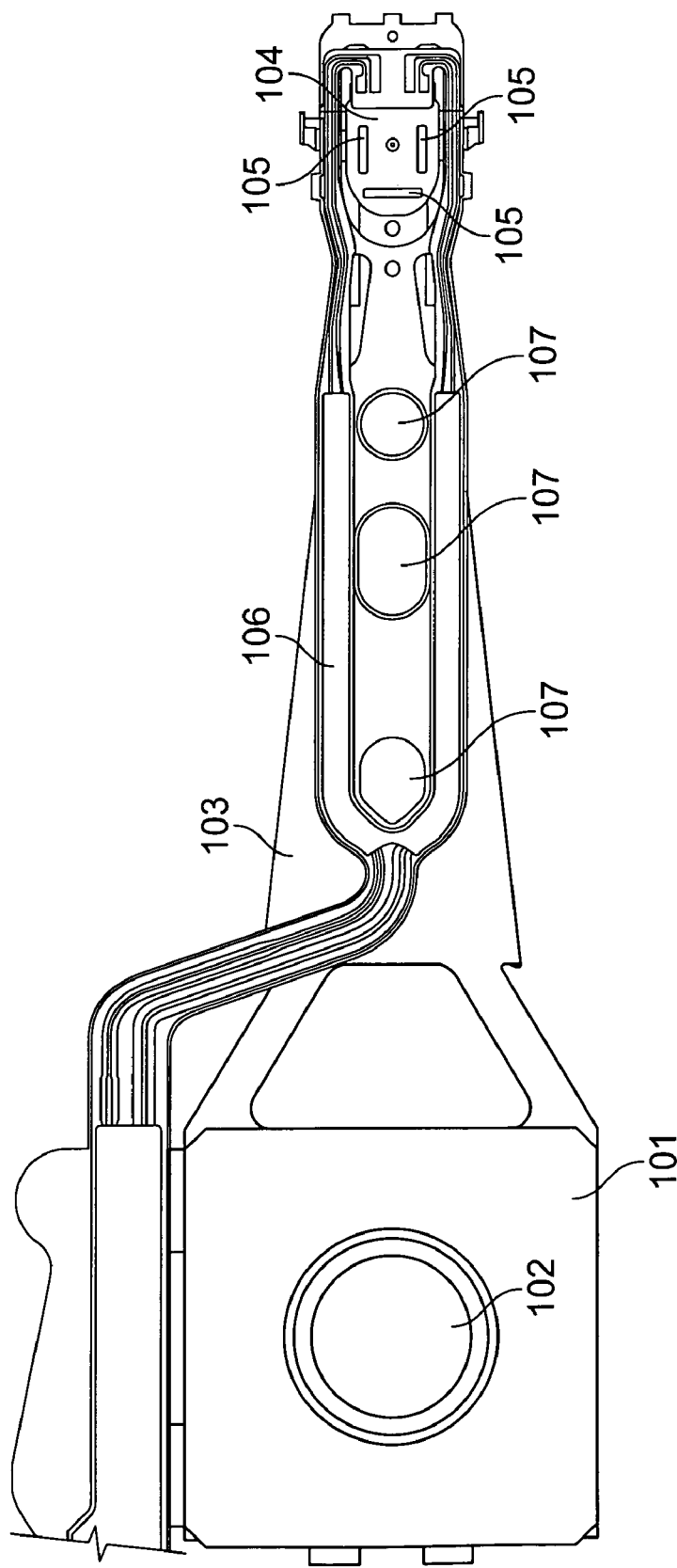
FIG. 1 illustrates one embodiment of a typical suspension.
Figure 2:
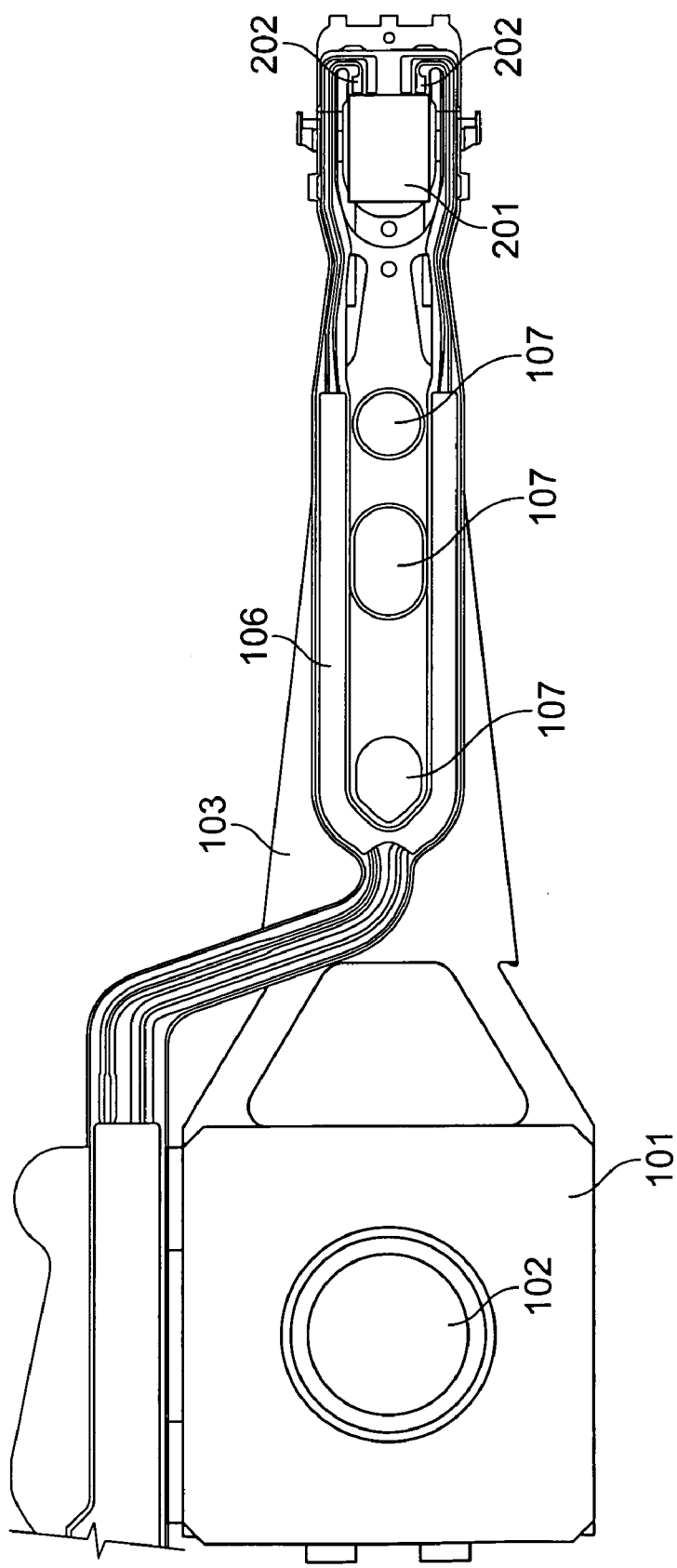
FIG. 2 illustrates one embodiment of a suspension coupled to a slider.
Figure 3:
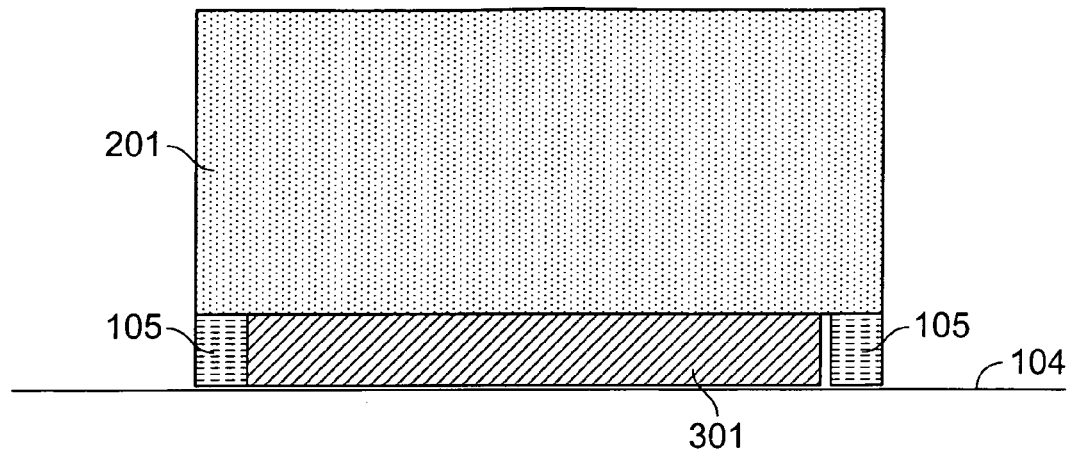
FIG. 3 illustrates one embodiment of a cross-section of the slider coupled to the suspension tongue.
Figure 4:
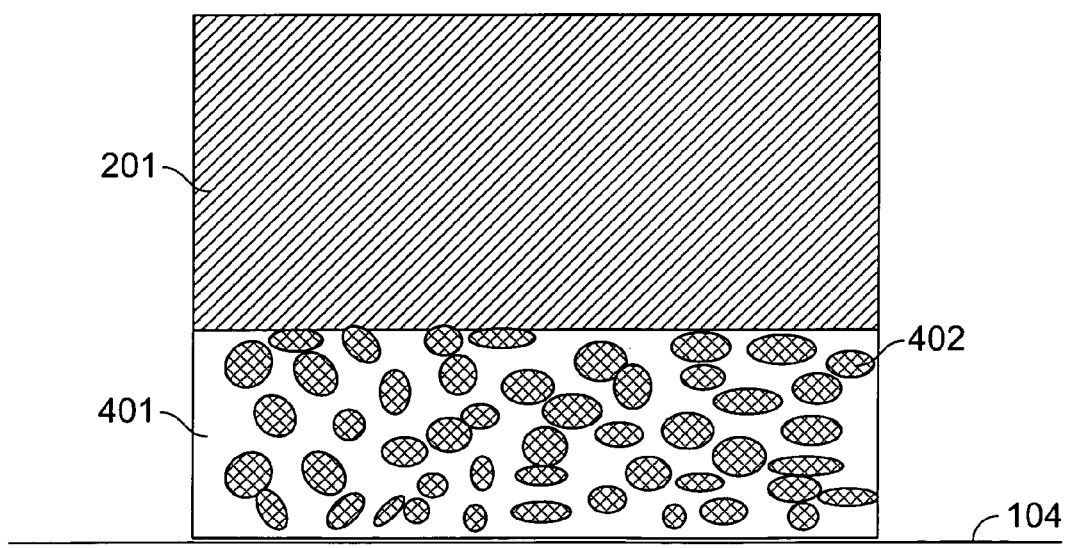
FIG. 4 illustrates in a cross section view one embodiment of a slider coupled to a suspension tongue with a bonding adhesive.

FIG. 4 illustrates in a cross section view one embodiment of a slider 201 coupled to a suspension tongue 104 with a bonding adhesive. In one embodiment, the slider 201 is composed of aluminum oxide ($Al_2O_3$) and titanium carbide (TiC). Aluminum oxide is non-conductive and titanium carbide is electrically conductive. In one embodiment, the bonding adhesive is Eccobond C-6800J, including a binder resin 401 and a silver powder 402. The binder resin is non-conductive and the silver powder is electrically conductive. In a further embodiment, the ratio of silver powder 402 to binder resin 401 is about 45%. With this arrangement, the silver powder is not likely to connect with the titanium carbide of the slider.

Figure 5:
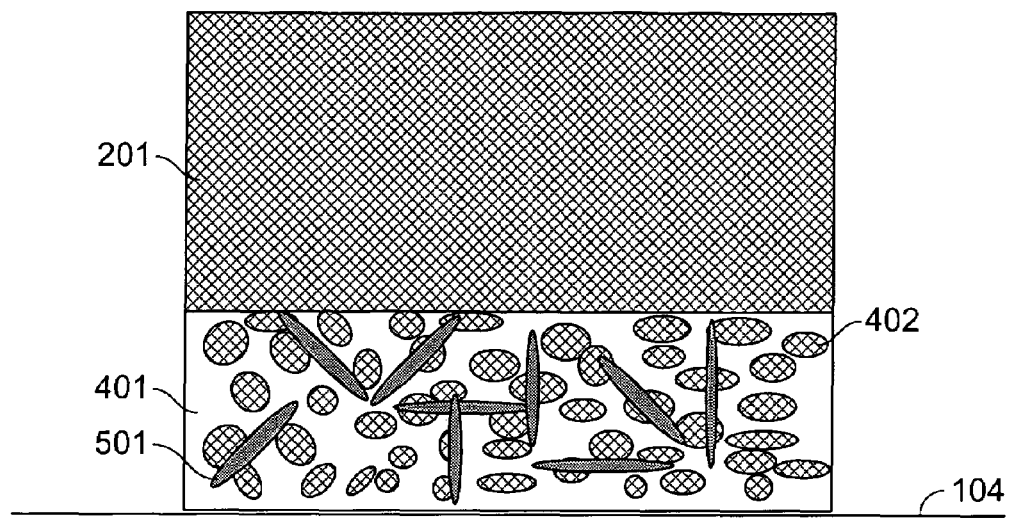
FIG. 5 illustrates in a cross section view one embodiment of the slider coupled to the suspension tongue with a compounded bonding adhesive.

FIG. 5 illustrates in a cross section view one embodiment of the slider 201 coupled to the suspension tongue 104 with a compounded bonding adhesive. In one embodiment, conductive fiber 501 is added to the bonding adhesive to improve the connection between the silver powders 402. The conductive fiber 501 also improves the contact of the conductive material with the titanium carbide. The conductive fiber 501 reduces the resistance between the slider 201 and the suspension tongue 104. In one embodiment, the conductive fiber 501 is a carbon coated potassium titanic acid whisker. In a further embodiment, the fiber 501 is from 10 to 20 µm in length and 0.3 to 0.6 µm in diameter.

Figure 6:
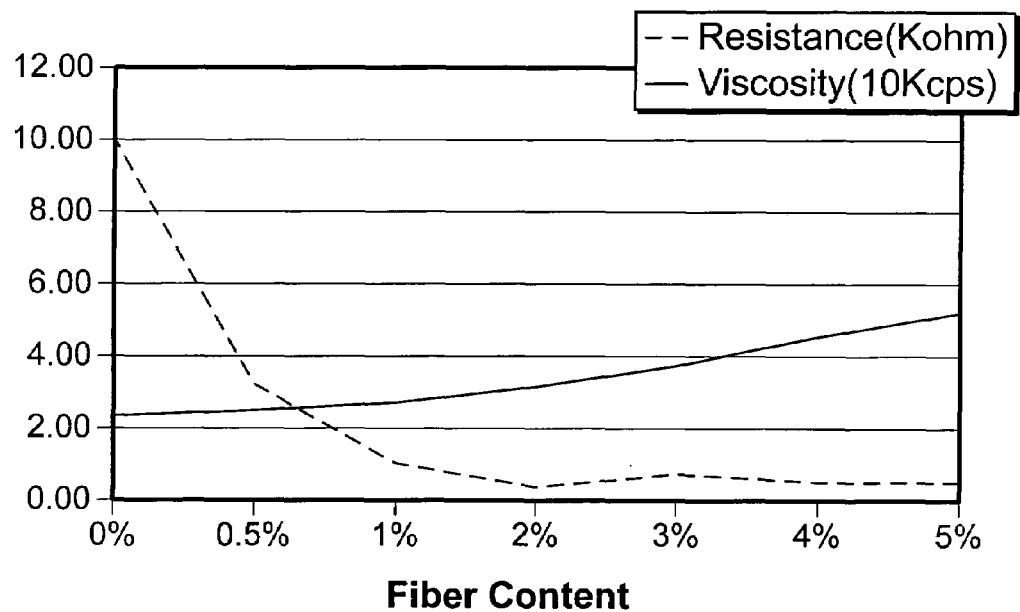
FIG. 6 illustrates in a line graph the relation of the conductive fiber content as a percentage of the whole to both resistance and adhesive viscosity.

FIG. 6 illustrates in a line graph the relation of the conductive fiber content as a percentage of the whole to both resistance in kilo ohms and adhesive viscosity in tens of kilocentipoise (Kcps). Higher conductive fiber content increases the adhesive viscosity, making the bonding adhesive more difficult to apply. The lower the fiber content the less the improvement in electric resistance. In one embodiment, the optimal conductive fiber weight percentage is between 1% and 4%. The conductive fiber weight percentage should not affect the bond strength of the bonding adhesive.

Figure 7A:
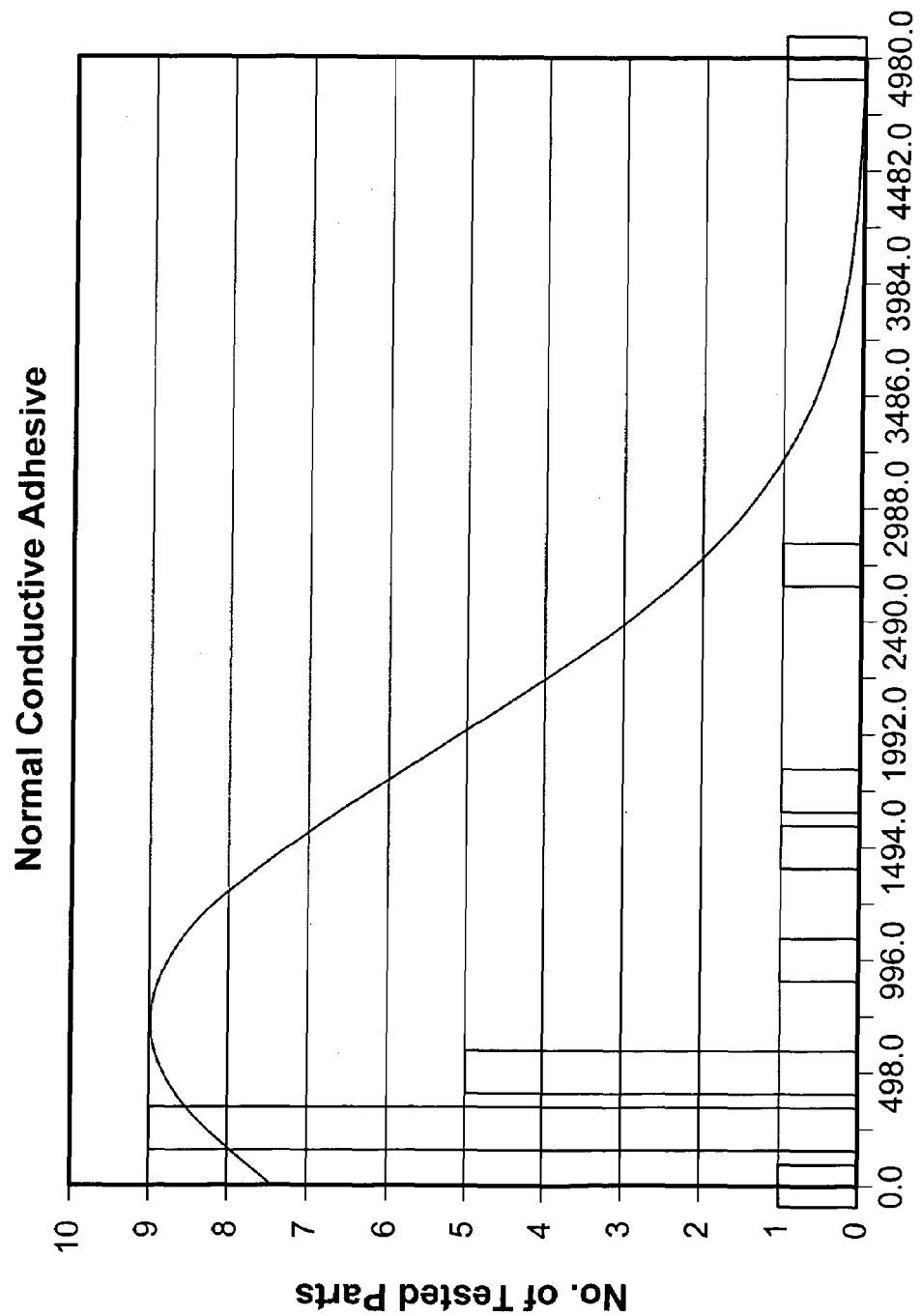
FIG. 7a illustrates in a graph the distribution of resistance in a prior conductive adhesive.
Figure 7B:
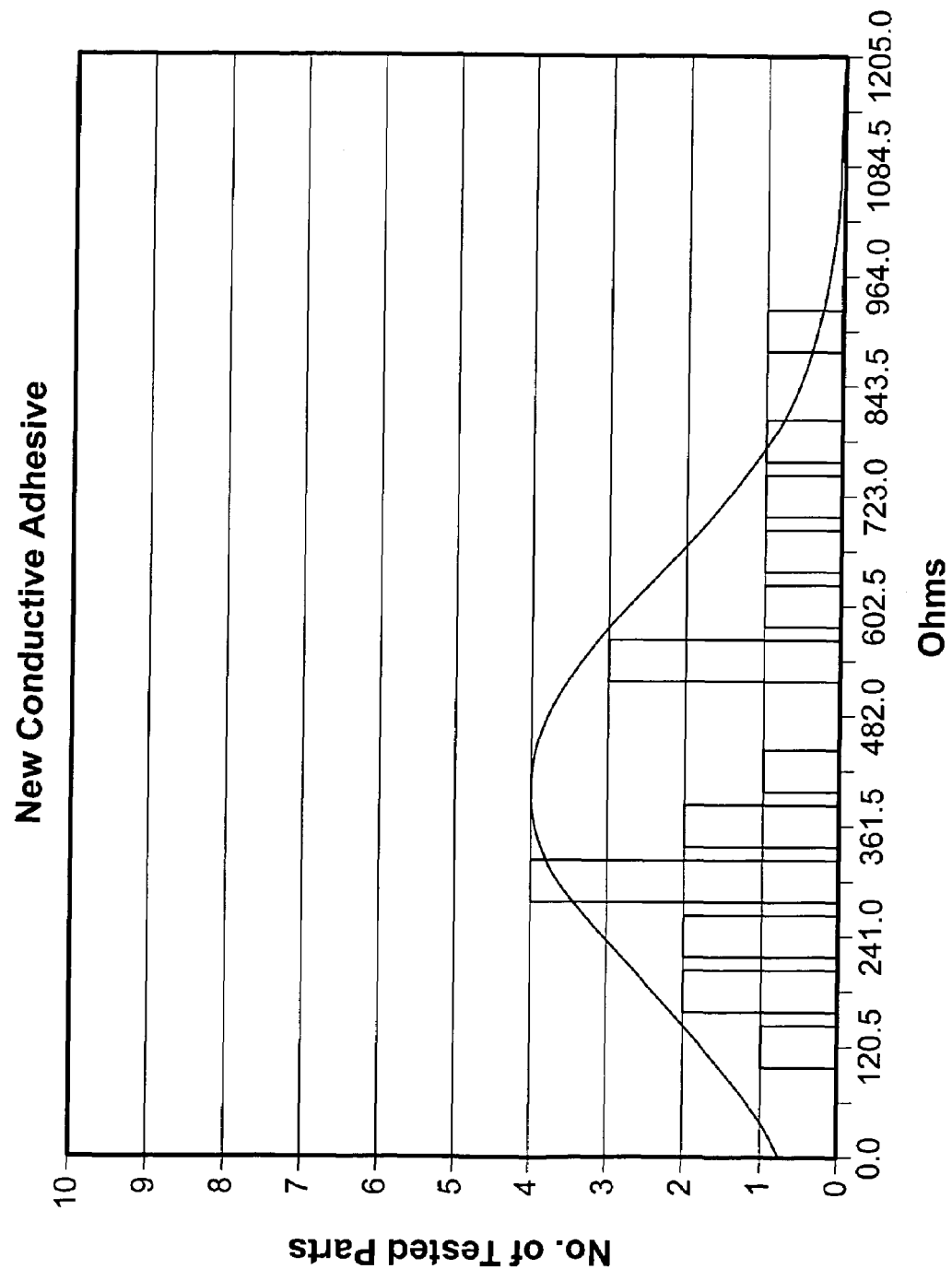
FIG. 7b illustrates in a graph the distribution of resistance in one embodiment of the disclosed conductive adhesive.

FIG. 7a illustrates the distribution of resistance in a prior conductive adhesive. The graph shows the number of tested parts that have a resistance in the listed ranges. In FIG. 7a, the resistance distribution range is large, in the range of 0 to 5000 ohms, well beyond the specification maximum of 1000 ohms. FIG. 7b illustrates the distribution of resistance in one embodiment of the disclosed conductive adhesive. In this embodiment, most of the adhesive tends to have a range of resistance distributed between 0 and 1000 ohms.

Although several embodiments are specifically illustrated and described herein, it will be appreciated that modifications and variations of the present invention are covered by the above teachings and within the purview of the appended claims without departing from the spirit and intended scope of the invention.

The invention claimed is:

1. A head gimbal assembly (HGA), comprising:
a slider;
an actuator arm to position the slider above a storage disk;
a suspension assembly to couple the slider to the actuator arm;
a bonding adhesive to couple the slider to the suspension assembly; and
conductive fibers embedded in the bonding adhesive to improve conductivity between the slider and the suspension assembly;
wherein the conductive fibers comprise carbon coated potassium titanic acid whiskers.

2. The HGA of claim 1, wherein the bonding adhesive comprises binder resin and silver powder.

3. The HGA of claim 1, wherein the slider comprises Aluminum Oxide and Titanium Carbide.

4. The HGA of claim 1, wherein the conductive fibers range in length from 10 μm to 20 μm and in diameter from 0.3 μm to 0.6 μm.

5. The HGA of claim 1, wherein the conductive fibers range in resistance from 0.01 ohm to 0.1 ohm.

6. A system, comprising:
a base to support the system;
a disk containing data;
a spindle motor coupled to the base to rotate the disk relative to the base;
a pivot assembly to facilitate rotation around an axis;
a slider;
an actuator arm to position the slider above a storage disk;
an actuator driving mechanism to rotate the actuator arm;
a suspension assembly to couple the slider to the actuator arm;
a bonding adhesive to couple the slider to the suspension assembly; and
conductive fibers embedded in the bonding adhesive to improve conductivity between the slider and the suspension assembly;
wherein the conductive fibers comprise carbon coated potassium titanic acid whiskers.

7. The system of claim 6, wherein the bonding adhesive comprises binder resin and silver powder.

8. The system of claim 6, wherein the slider comprises Aluminum Oxide and Titanium Carbide.

9. The system of claim 6, wherein the conductive fibers range in length from 10 μm to 20 μm, and in diameter from 0.3 μm to 0.6 μm.

10. The system of claim 6, wherein the conductive fibers range in resistance from 0.01 ohm to 0.1 ohm.

11. A method, comprising:
mixing conductive fibers with a bonding adhesive; and
coupling a slider to a suspension assembly of a head gimbal assembly using the bonding adhesive;
wherein the conductive fibers comprise carbon coated potassium titanic acid whisker.

12. The method of claim 11, wherein the bonding adhesive comprises binder resin and silver powder.

13. The method of claim 11, wherein the slider comprises Aluminum Oxide and Titanium Carbide.

14. The method of claim 11, wherein the conductive fibers range in length from 10 μm to 20 μm, and in diameter from 0.3 μm to 0.6 μm.

15. The method of claim 11, wherein the conductive fibers range in resistance from 0.01 ohm to 0.1 ohm.

16. A head gimbal assembly (HGA), comprising:
a slider;
an actuator arm to position the slider above a storage disk;
a suspension assembly to couple the slider to the actuator arm;
a bonding adhesive to couple the slider to the suspension assembly; and
conductive fibers embedded in the bonding adhesive to improve conductivity between the slider and the suspension assembly;
wherein the conductive fibers are mixed with the bonding adhesive in a 1% to 4% mixing ratio.

17. The HGA of claim 16, wherein the bonding adhesive comprises binder resin and silver powder.

18. The HGA of claim 16, wherein the slider comprises Aluminum Oxide and Titanium Carbide.

19. The HGA of claim 16, wherein the conductive fibers range in length from 10 μm to 20 μm and in diameter from 0.3 μm to 0.6 μm.

20. The HGA of claim 16, wherein the conductive fibers range in resistance from 0.01 ohm to 0.1 ohm.

21. A system, comprising:
a base to support the system;
a disk containing data;
a spindle motor coupled to the base to rotate the disk relative to the base;
a pivot assembly to facilitate rotation around an axis;
a slider;
an actuator arm to position the slider above a storage disk;
an actuator driving mechanism to rotate the actuator arm;
a suspension assembly to couple the slider to the actuator arm;
a bonding adhesive to couple the slider to the suspension assembly; and
conductive fibers embedded in the bonding adhesive to improve conductivity between the slider and the suspension assembly;
wherein the conductive fibers are mixed with the banding adhesive in a 1% to 4% mixing ratio.

22. The system of claim 21, wherein the bonding adhesive comprises binder resin and silver powder.

23. The system of claim 21, wherein the slider comprises Aluminum Oxide and Titanium Carbide.

24. The system of claim 21, wherein the conductive fibers range in length from 10 μm to 20 μm, and in diameter from 0.3 μm to 0.6 μm.

25. The system of claim 21, wherein the conductive fibers range in resistance from 0.01 ohm to 0.1 ohm.

26. A method, comprising:
mixing conductive fibers with a bonding adhesive;
coupling a slider to a suspension assembly of a head gimbal assembly using the bonding adhesive; and
mixing the conductive fibers with the bonding adhesive in a 1% to 4% mixing ratio.

27. The method of claim 26, wherein the bonding adhesive comprises binder resin and silver powder.

28. The method of claim 26, wherein the slider comprises Aluminum Oxide and Titanium Carbide.

29. The method of claim 26, wherein the conductive fibers range in length from 10 μm to 20 μm, and in diameter from 0.3 μm to 0.6 μm.

30. The method of claim 26, wherein the conductive fibers range in resistance from 0.01 ohm to 0.1 ohm.

* * * * *